United States Patent
Bosse, Jr.

[11] Patent Number: 6,133,524
[45] Date of Patent: *Oct. 17, 2000

[54] COMBINED WALL MOUNT AND ELECTRICAL OUTLET BOX

[75] Inventor: John J. Bosse, Jr., Lancaster, N.Y.

[73] Assignee: Boss Products Corporation, Orchard Park, N.Y.

[ * ] Notice: This patent is subject to a terminal disclaimer.

[21] Appl. No.: 09/296,339

[22] Filed: Apr. 22, 1999

Related U.S. Application Data

[63] Continuation of application No. 08/914,859, Aug. 19, 1997, Pat. No. 5,952,610, which is a continuation-in-part of application No. 08/742,997, Oct. 16, 1996, Pat. No. 5,920,033, which is a continuation of application No. 08/241,764, May 12, 1994, Pat. No. 5,578,791.

[51] Int. Cl.[7] .................................................. H02G 3/10
[52] U.S. Cl. .............................. 174/48; 174/65 R
[58] Field of Search ........................ 174/48, 50, 65 R; 52/28, 60, 62, 220.8; 248/205.1; 362/147, 432; 220/3.2, 3.3, 3.92, 3.94, 4.02

[56] References Cited

U.S. PATENT DOCUMENTS

| | | |
|---|---|---|
| 1,484,001 | 2/1924 | Ainsworth . |
| 1,898,282 | 2/1933 | Almcrantz . |
| 3,701,837 | 10/1972 | Fork .......................................... 174/50 |
| 4,135,337 | 1/1979 | Medlin ..................................... 52/221 |
| 4,167,196 | 9/1979 | Morris ................................. 220/3.8 X |
| 4,222,093 | 9/1980 | Garcia et al. ........................... 362/147 |
| 4,323,723 | 4/1982 | Fork et al. ................................. 174/48 |
| 4,635,168 | 1/1987 | Crowley ................................... 562/147 |
| 4,724,281 | 2/1988 | Nix et al. ............................... 174/65 R |
| 4,726,152 | 2/1988 | Vagedes et al. ............................ 52/28 |
| 4,920,708 | 5/1990 | MacLeod et al. ........................... 52/60 |
| 4,920,709 | 5/1990 | Garries et al. .............................. 52/85 |
| 4,922,056 | 5/1990 | Larsson ................................. 174/65 R |
| 5,000,409 | 3/1991 | MacLeod et al. ....................... 248/205 |
| 5,177,325 | 1/1993 | Giammanco .............................. 174/50 |
| 5,287,665 | 2/1994 | Rath, Jr. .................................... 174/48 |
| 5,307,254 | 4/1994 | Russello et al. ........................ 362/368 |
| 5,350,884 | 9/1994 | Littrell ..................................... 174/48 |
| 5,397,093 | 3/1995 | Chubb et al. ........................... 248/544 |
| 5,448,011 | 9/1995 | Laughlin ................................. 174/48 |
| 5,486,650 | 1/1996 | Yetter ...................................... 174/53 |
| 5,578,791 | 11/1996 | Bosse, Jr. ................................. 174/48 |
| 5,920,033 | 7/1999 | Bosse, Jr. ................................. 174/48 |
| 5,952,610 | 9/1999 | Bosse, Jr. ................................. 174/48 |

OTHER PUBLICATIONS

Brochure entitled "The Mid America Master Series"—16 pages (Copyright 1994).
Brochure entitled "Zip Box Blue Nonmetallic Switch and Outlet Boxes " 18, pages, © Carlon 1992.

Primary Examiner—Dean A. Reichard
Attorney, Agent, or Firm—Joseph P. Gastel

[57] ABSTRACT

A combined wall mount and electrical outlet box unit for mounting on a wall surface including a molded plastic combination of a housing having side walls and a front wall, flanges having inner edges proximate the housing and extending outwardly from the side walls, spaced inner walls formed integrally with the insides of certain of the side walls and the front wall to define an electrical outlet box, a preformed opening in the front wall between the inner walls leading to a chamber which constitutes the electrical outlet box, a plate sealed across the inner edges of the flanges for enclosing the rear side of the housing, openings in the plate for receiving wires leading into the chamber of the electrical outlet box, and arcuate score marks on the front wall on opposite sides of the preformed opening.

16 Claims, 3 Drawing Sheets

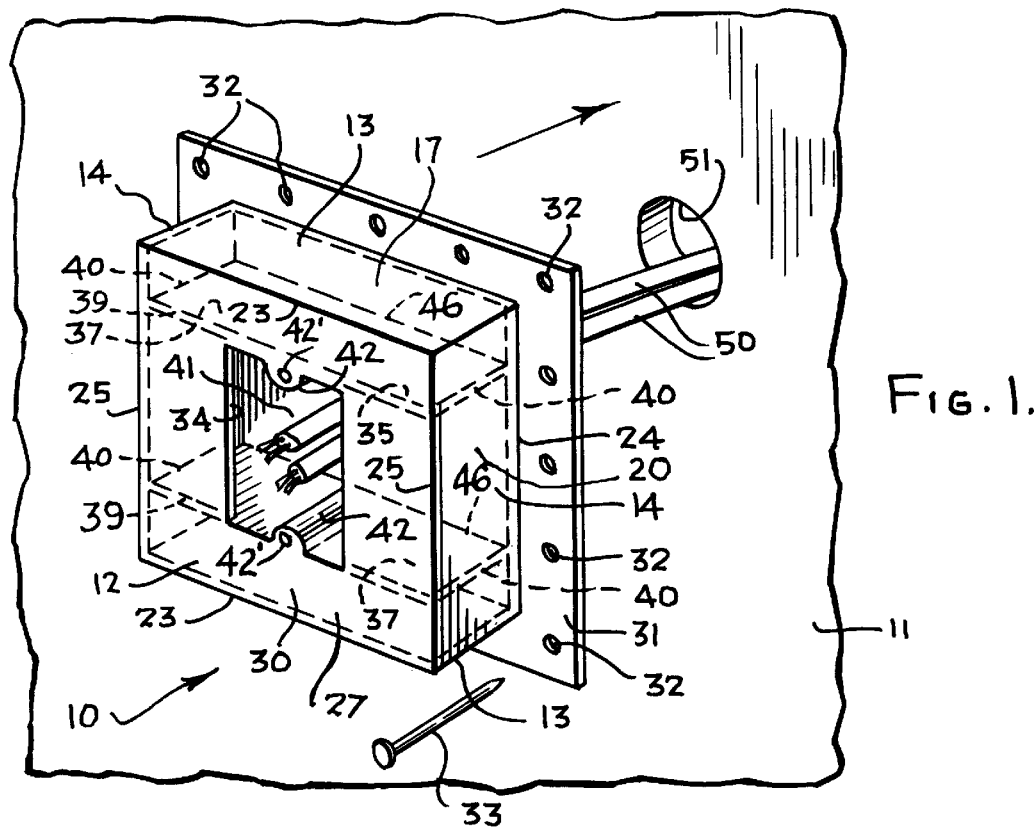
FIG. 1.
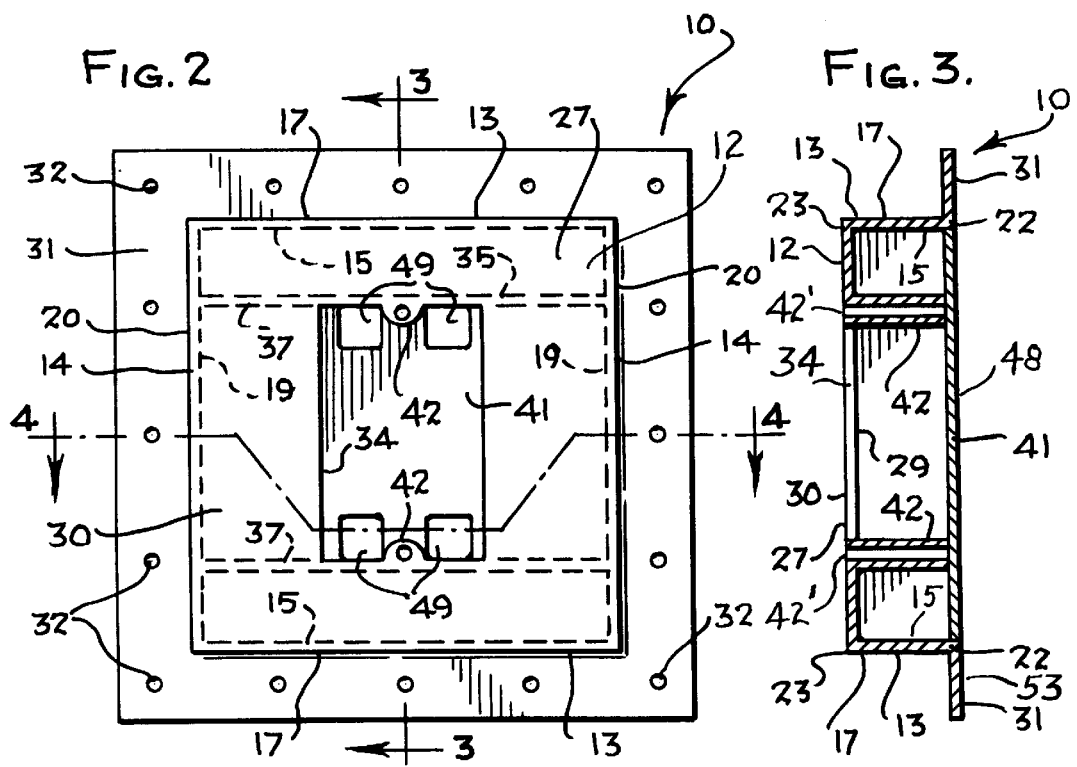
FIG. 2.
FIG. 3.

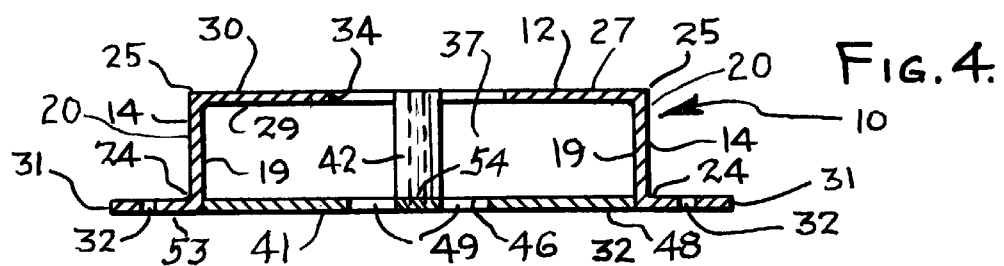
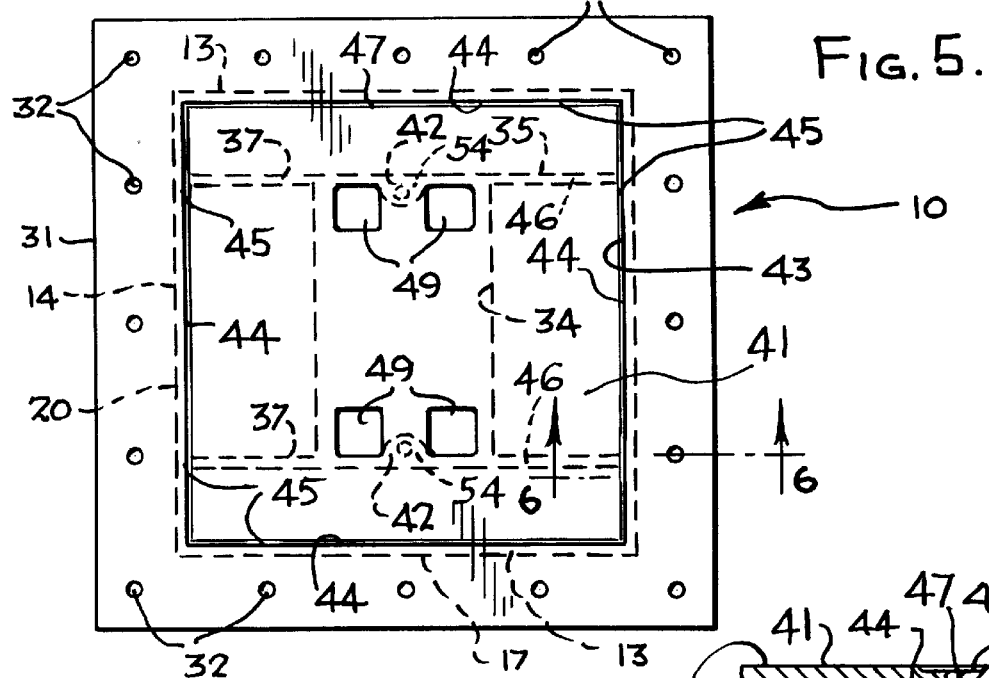
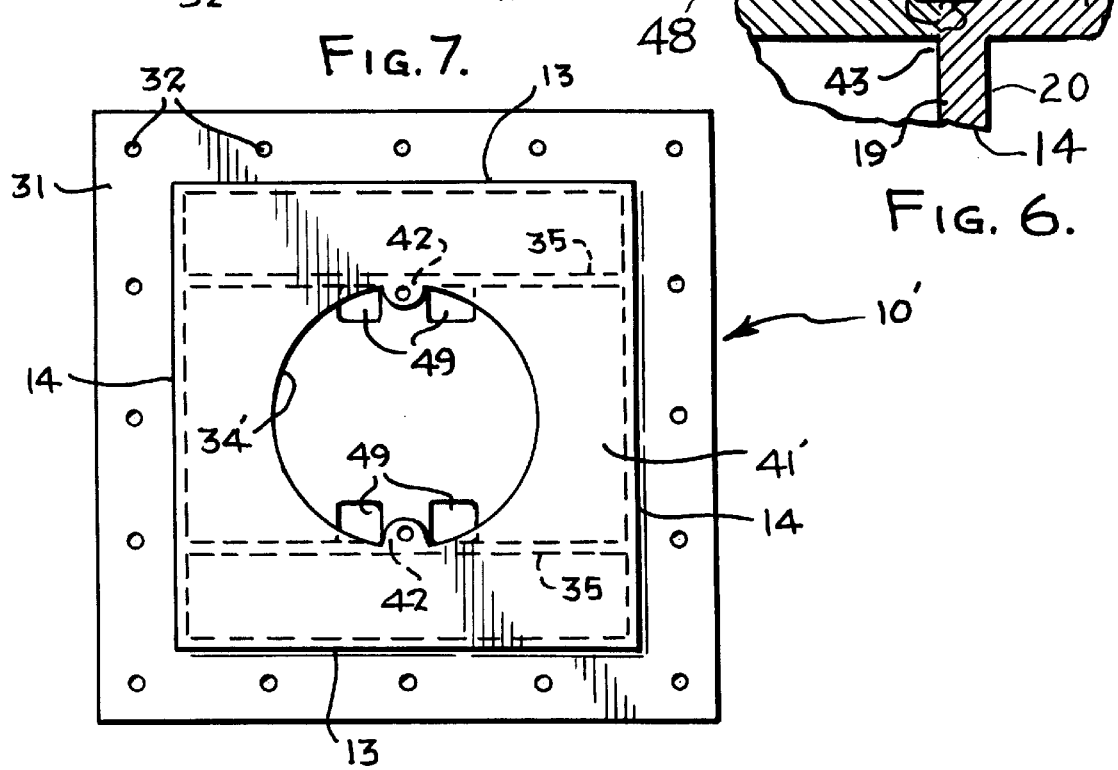

COMBINED WALL MOUNT AND ELECTRICAL OUTLET BOX

CROSS-REFERENCE TO RELATED APPLICATIONS

This is a continuation of application Ser. No. 08/914,859 filed Aug. 19, 1997, now U.S. Pat. No. 5,952,610, which is a continuation-in-part of Ser. 08/742,997, filed Oct. 16, 1996, now U.S. Pat. No. 5,920,033, which is a continuation of Ser. 08/241,764, filed May 12, 1994, now U.S. Pat. No. 5,578,791.

STATEMENT REGARDING FEDERALLY SPONSORED RESEARCH OR DEVELOPMENT

Not Applicable

BACKGROUND OF THE INVENTION

The present invention relates to a combined wall mount and electrical outlet box unit.

By way of background, in the past wall mounts having the general outer configuration shown in FIG. 1 of the drawings were supplied with a solid front wall having score marks thereon. In use, the installer had to cut out an opening in the shape of the perimeter of the electrical outlet box from the front wall. However, this was a time-consuming and tedious task because the wall mounts were fabricated of tough polyethylene plastic or metal. Thereafter, a separate conventional electric outlet box was slid into the opening which was cut out in the wall mount. This outlet box was of conventional shape, and, as noted above, it had an outer perimeter which was the size of the opening which was cut into the face of the wall mount. There were no connections between the wall mount and the electrical outlet box other than the contact therebetween at the cutout portion in the face of the wall mount.

BRIEF SUMMARY OF THE INVENTION

It is one object of the present invention to provide a combined wall mount and electrical outlet box unit wherein the electrical outlet box is an integral portion of the wall mount, thereby obviating the necessity to cut the front wall of the wall mount for receiving an electrical outlet unit box.

Another object of the present invention is to provide a combined wall mount and electrical outlet box unit wherein the electrical outlet box portion is much larger than the separate outlet box which was previously installed into the separate wall mount.

A further object of the present invention is to provide an improved one-piece wall mount and electrical outlet box unit wherein the electrical outlet box portion is firmly secured to the wall mount because it is an integral molded part thereof.

Yet another object of the present invention is to provide a combined wall mount and electrical outlet box unit which has a rear wall which is flush with the mounting flange thereof and which serves as an enclosing portion of the electrical outlet box.

A still further object of the present invention is to provide an improved one-piece wall mount and electrical outlet box which has a preformed rectangular opening in its front wall and arcuate score marks on opposite sides of the rectangular opening to permit the rectangular opening to be selectively converted to a substantially circular opening.

Yet another object of the present invention is to provide a one-piece wall mount and electrical outlet box having a preformed opening in its front wall and an opening in its rear wall which is centered relative to the preformed opening for receiving electrical wires. Other objects and attendant advantages of the present invention will readily be perceived hereafter.

The present invention relates to a plastic electrical wall mount unit for mounting on a surface comprising a housing, a plurality of side walls on said housing, inner and outer sides on said side walls, inner and outer edges on said side walls, a front wall integral with said side walls proximate said outer edges of said side walls and extending inwardly therefrom toward other of said side walls, a flange integral with said side walls proximate said inner edges of said side walls and extending outwardly away from said outer sides of said side walls, a preformed opening in said front wall, and arcuate score marks on said front wall on opposite sides of said preformed opening.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 1 is a perspective view of the one-piece combined wall mount and electrical box unit located relative to a wall onto which it is to be mounted;

FIG. 2 is a front elevational view of the combined wall mount and electrical outlet box unit;

FIG. 3 is a cross sectional view taken substantially along line 3—3 of FIG. 2;

FIG. 4 is a cross sectional view taken substantially along line 4—4 of FIG. 2;

FIG. 5 is a rear elevational view of the combined wall mount and electrical outlet box unit;

FIG. 6 is an enlarged fragmentary cross sectional view taken substantially along line 6—6 of FIG. 5 and showing the manner in which the back plate is secured to the rear side of the combined wall mount and electrical outlet box unit;

FIG. 7 is a front elevational view of a modified embodiment of the combined wall mount and electrical outlet box unit.

DETAILED DESCRIPTION OF THE INVENTION

Figure 8:
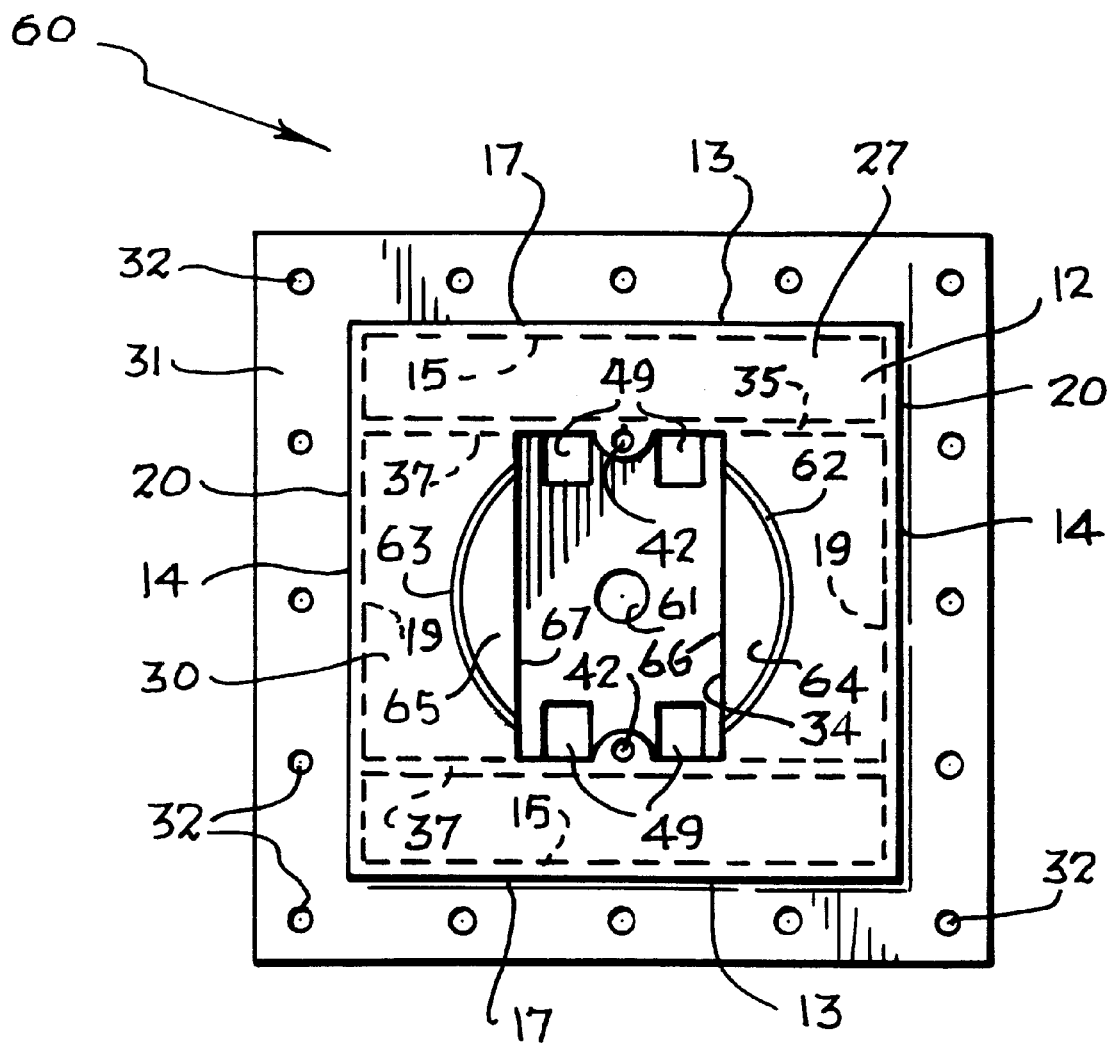
FIG. 8 is a front elevational view of a modified embodiment of the combined wall mount and electrical box unit of FIGS. 1–6.

In FIG. 1 the improved combined wall mount and electrical outlet box unit 10 is shown in the process of being mounted relative to a wall 11 of a building. Wall 11 may be an external wall or an internal wall of wood or masonry. The unit 10 includes a housing 12 consisting of a plurality of walls which includes a pair of opposed side walls 13 and a pair of opposed side walls 14. In the present instance walls 13 and 14 are all of equal length. Walls 13 have inner sides 15 and outer sides 17. Walls 14 have inner sides 19 and outer sides 20. Walls 13 have inner edges 22 and outer edges 23. Walls 14 have inner edges 24 and outer edges 25. The front wall 27 is connected across the outer edges 23 and 25 of the side walls 13 and 14, respectively. Front wall 27 includes an inner surface 29 and an outer surface 30. A mounting flange 31 extends outwardly from the inner edges 22 and 24 of side walls 13 and 14, respectively. Spaced apertures 32 are located in mounting flange 31 for receiving fasteners, such as nails 33, for securing the mounting flange relative to wall 11, or the mounting flange 31 may be secured to wall 11 by glue. An opening 34 is located in front wall 30.

An electrical outlet box 35 is formed integrally within housing 12 by a pair of spaced inner walls 37 which have front edges 39 (FIG. 1) secured to front wall 27 and they have side edges 40 secured to side walls 14. Thus, electrical outlet box portion 35 is bounded by walls 37 and portions of side walls 14 which lie between walls 37. By virtue of this construction, the outlet box portion 35 is much larger than a conventional outlet box wherein the side walls would extend rearwardly from the edges of opening 34 in front wall 27. This permits box 35 to accommodate greater amounts of wires. Elongated tubular members 42 are molded integrally with the inner walls 37 and have bores 42' therein for receiving fasteners, such as screws (not shown), for securing an external member, such as a cover plate or a light fixture or a switch or a plug across opening 34. At this point it is to be noted that all of the above-described non-metallic structure is molded from suitable plastic, such as polyethylene, as an integral unit.

To complete the combined wall mount and electrical outlet box unit 10, a rear plate or wall 41 is placed into an opening 43 (FIG. 5) which is defined by the inner edges 44 of flange 31. Plate 41 bears against rear edges 46 of box walls 37 and the ends 54 of tubular members 42. This causes box 35 to be completely closed except for the opening 34 in front wall 30 and except for the openings 49 in the plate 41. Plate 41 is secured in opening 43 by a PVC heat weld or bond at 45 between the entire edge 47 of plate 41 and the entire contiguous edge 44 of flange 31, to thereby provide a seal therebetween against the passage of foreign matter into box 35, especially water. The rear surface 48 of wall 41 is substantially coplanar with the rear surface 53 of flange 31 so that the rear of unit 10 will fit flush against building wall 11. The openings 49 are provided in plate 41 for receiving wires, such as 50, which are passed into box 35 after having passed through opening 51 in building wall 11.

After the unit 10 has been mounted on wall 11, the entire outer edge of flange 31 is preferably caulked prior to the application of siding to wall 11.

A modified embodiment 10' of the combined wall mount and electrical outlet box unit is shown in FIG. 7. The unit 10' of FIG. 7 is identical in all respects to the embodiment of FIGS. 1–6 except that the front wall 41' is different in that it has a circular opening 34' rather than the rectangular opening 34 of the previous figures.

It is to be noted that while the unit 10 is shown in FIGS. 1–5 with the opening 34 having its lengthwise dimension oriented vertically, it can be mounted with its lengthwise direction horizontally.

In FIG. 8 a modified combined wall mount and electrical outlet box unit 60 of the embodiment of FIGS. 1–5 is shown. Unit 60 includes all of the structure of unit 10 of FIGS. 1–6, and identical numerals represent identical elements of structure. However, unit 60 contains two elements of additional structure, namely, central opening 61 in rear wall 41 and light score marks 62 and 63 in front wall 27. The central opening 61 permits wires, such as 50 of FIG. 1, to enter the exact central portion of electrical box 35. Score marks 62 and 63 are arcs of a circle having its center on a perpendicular projection of the center of opening 61 into the plane of front wall 27. Score marks 62 and 63 are for receiving a shear for cutting segments 64 and 65 out of front wall 27. Segment 64 is defined by chord 66 and arc 62, and segment 65 is defined by chord 67 and arc 63. The existence of score marks 62 and 63 permit the rectangular opening 34 in front wall 27 to be essentially converted to a substantially circular opening by the excising of segments 64 and 65 along score marks 62 and 63 so that a circular base of an electrical fixture can be more conveniently mounted on front wall 27. While opening 61 is shown as being exactly centrally located relative to opening 34 of the front wall, it will be appreciated that it can be generally centrally located so that it is spaced at least its diameter away from the sides of opening 34.

It can thus be seen that the combined wall mount and electrical outlet box units of the present invention are manifestly capable of achieving the above-enumerated objects, and while preferred embodiments of the present invention have been disclosed, it will be appreciated that they are not limited thereto but may be otherwise embodied within the scope of the following claims.

What is claimed is:

1. A plastic electrical wall mount unit for mounting on a surface comprising a housing, a plurality of side walls on said housing, inner and outer sides on said side walls, inner and outer edges on said side walls, a front wall integral with said side walls proximate said outer edges of said side walls and extending inwardly therefrom toward other of said side walls, a flange integral with said side walls proximate said inner edges of said side walls and extending outwardly away from said outer sides of said side walls, a preformed opening in said front wall, fastener-receiving members secured within and in spaced relationship to said side walls, and including a box comprising a plurality of box walls within said housing.

2. A plastic electrical wall mount unit as set forth in claim 1 including arcuate score marks on said front wall on opposite sides of said preformed opening.

3. A plastic electrical wall mount unit for mounting on a surface comprising a housing, a plurality of side walls on said housing, inner and outer sides on said side walls, inner and outer edges on said side walls, a front wall integral with said side walls proximate said outer edges of said side walls and extending inwardly therefrom toward other of said side walls, a flange integral with said side walls proximate said inner edges of said side walls and extending outwardly away from said outer sides of said side walls, a preformed opening in said front wall, fastener-receiving members secured within and in spaced relationship to said side walls, and a rear wall spaced from and located in opposition to said preformed opening.

4. A plastic electrical wall mount unit as set forth in claim 3 including arcuate score marks on said front wall on opposite sides of said preformed opening.

5. A plastic electrical wall mount unit as set forth in claim 3 including a second opening in said rear wall.

6. A plastic electrical wall mount unit as set forth in claim 5 including arcuate score marks on said front wall on opposite sides of said preformed opening.

7. A plastic electrical wall mount unit as set forth in claim 3 including a box comprising a plurality of box walls within said housing.

8. A plastic electrical wall mount unit as set forth in claim 7 including arcuate score marks on said front wall on opposite sides of said preformed opening.

9. A plastic electrical wall mount unit for mounting on a surface comprising a housing, a plurality of side walls on said housing, inner and outer sides on said side walls, inner and outer edges on said side walls, a front wall integral with said side walls proximate said outer edges of said side walls and extending inwardly therefrom toward other of said side walls, a flange integral with said side walls proximate said inner edges of said side walls and extending outwardly away from said outer sides of said side walls, a preformed opening in said front wall, and a box comprising a plurality of box walls within said housing.

10. A plastic electrical wall mount unit as set forth in claim 9 including arcuate score marks on said front wall on opposite sides of said preformed opening.

11. A plastic electrical wall mount unit as set forth in claim 9 including a rear wall -located within said side walls in opposition to said preformed opening.

12. A plastic electrical wall mount unit as set forth in claim 11 including arcuate score marks on said front wall on opposite sides of said preformed opening.

13. A plastic electrical wall mount unit for mounting on a surface comprising a housing, a plurality of side walls on said housing, inner and outer sides on said side walls, inner and outer edges on said side walls, a front wall integral with said side walls proximate said outer edges of said side walls and extending inwardly therefrom toward other of said side walls, a flange integral with said side walls proximate said inner edges of said side walls and extending outwardly away from said outer sides of said side walls, a preformed opening in said front wall, said side walls being of substantially equal length, and a box comprising a plurality of box walls within said housing.

14. A plastic electrical wall mount unit as set forth in claim 13 including arcuate score marks on said front wall on opposite sides of said preformed opening.

15. A plastic electrical wall mount unit for mounting on a surface comprising a housing, a plurality of side walls on said housing, inner and outer sides on said side walls, inner and outer edges on said side walls, a front wall proximate said outer edges of said side walls and extending inwardly therefrom toward at least certain other of said side walls, a flange proximate said inner edges of said side walls and extending outwardly away from said outer sides of at least certain of said side walls, a preformed opening in said front wall having a first dimension, and a space within said housing which has a second dimension which is larger than said first dimension, said space being within a box having a plurality of box walls located within said side walls.

16. A plastic electrical wall mount unit as set forth in claim 15 including arcuate score marks on said front wall on opposite sides of said preformed opening.

\* \* \* \* \*